(12) United States Patent
Kim et al.

(10) Patent No.: US 9,495,964 B2
(45) Date of Patent: Nov. 15, 2016

(54) SYSTEMS, COMPUTER-IMPLEMENTED METHODS, AND TANGIBLE COMPUTER-READABLE STORAGE MEDIA FOR TRANSCRIPTION ALIGNMENT

(71) Applicant: AT&T Intellectual Property I, L.P., Atlanta, GA (US)

(72) Inventors: Yeon-Jun Kim, Whippany, NJ (US); David C. Gibbon, Lincroft, NJ (US); Horst J. Schroeter, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/071,644

(22) Filed: Mar. 16, 2016

(65) Prior Publication Data

US 2016/0198234 A1 Jul. 7, 2016

Related U.S. Application Data

(63) Continuation of application No. 14/492,616, filed on Sep. 22, 2014, now Pat. No. 9,305,552, which is a continuation of application No. 12/542,359, filed on Aug. 17, 2009, now Pat. No. 8,843,368.

(51) Int. Cl.
*G10L 15/00* (2013.01)
*G10L 15/26* (2006.01)
(Continued)

(52) U.S. Cl.
CPC .............. *G10L 15/265* (2013.01); *G10L 13/08* (2013.01); *G10L 21/055* (2013.01); *G11B 27/10* (2013.01); *H04N 21/44004* (2013.01); *H04N 21/4884* (2013.01)

(58) Field of Classification Search
CPC ...... G10L 15/265; G10L 15/26; G10L 21/06; G11B 27/10; H04N 21/4884
USPC .................................. 704/231, 235, 251, 271
See application file for complete search history.

(56) References Cited

U.S. PATENT DOCUMENTS 6,076,059 A 6/2000 Glickman et al.
6,442,518 B1 8/2002 Van Thong et al.
(Continued)

OTHER PUBLICATIONS

Munteanu et al., "Improving Automatic Speech Recognition for Lectures through Transformation-based Rules Learned from Minimal Data", Proceedings of the 47th Annual Meeting of the ACL and the 4th JCNLP of the AFNLP, pp. 764-772, Aug. 2-7, 2009.
(Continued)

*Primary Examiner* — Shaun Roberts

(57) ABSTRACT

Disclosed herein are systems, computer-implemented methods, and tangible computer-readable storage media for captioning a media presentation. The method includes receiving automatic speech recognition (ASR) output from a media presentation and a transcription of the media presentation. The method includes selecting via a processor a pair of anchor words in the media presentation based on the ASR output and transcription and generating captions by aligning the transcription with the ASR output between the selected pair of anchor words. The transcription can be human-generated. Selecting pairs of anchor words can be based on a similarity threshold between the ASR output and the transcription. In one variation, commonly used words on a stop list are ineligible as anchor words. The method includes outputting the media presentation with the generated captions. The presentation can be a recording of a live event.

20 Claims, 5 Drawing Sheets

(51) Int. Cl.
*H04N 21/488* (2011.01)
*G10L 21/055* (2013.01)
*G10L 13/08* (2013.01)
*H04N 21/44* (2011.01)
*G11B 27/10* (2006.01)

(56) References Cited

U.S. PATENT DOCUMENTS 6,975,985 B2 12/2005 Kriechbaum et al.
8,131,545 B1 3/2012 Moreno

OTHER PUBLICATIONS

A. Martone, C. Taskiran, and E. Delp, "Automated Closed-Captioning Using Text Alignment", SPIE Conference of Storage and Retrieval for Multimedia Databases 2004, Jan. 18-22, 2004, San Jose, CA.

P. Moreno, C. Joerg, J.M. VanThong, and O. Glickman, "A recursive algorithm for the forced alignment of very long audio segments," In Proceedings of the International Conference on Spoken Language Processing, Sydney, Australia, Dec. 1998.

Timothy J. Hazen, "Automatic alignment and error correction of human generated transcripts for long speech recordings," Proceedings of Interspeech 2006, Pittsburgh, PA, Sep. 2006.

SYSTEMS, COMPUTER-IMPLEMENTED METHODS, AND TANGIBLE COMPUTER-READABLE STORAGE MEDIA FOR TRANSCRIPTION ALIGNMENT

PRIORITY INFORMATION

The present application is a continuation of U.S. patent application Ser. No. 14/492,616, filed Sep. 22, 2014, which is a continuation of U.S. patent application Ser. No. 12/542,359, filed Aug. 17, 2009, now U.S. Pat. No. 8,843,368, issued Sep. 23, 2014, the contents of which are incorporated herein by reference in their entirety.

BACKGROUND

1. Technical Field

The present disclosure relates to transcription and more specifically to aligning transcription accurately with speech.

2. Introduction

Many live television or radio shows include closed captioning, or text messages appearing at the bottom of the screen to assist the hearing impaired in understanding the show. Closed captions can also be of use in loud areas where people can not hear the audio clearly, such as televisions in noisy environments like a bar or in a busy airport terminal. Closed captions are typically manually generated in one of two ways.

The first way is to manually transcribe what is said in real time or near real time. This approach introduces a delay of several seconds or longer because even the fastest human transcriptionist must first hear and understand the speech, then type a transcription of the speech. While faster transcription times reduce the delay, the delay still exists. This delay causes problems for searching and indexing because searches matching a caption return a later point in the media than the actual matching speech. Further, this delay can cause confusion or can be an annoyance for viewers who see a video on the screen and read text captions that are out of sync.

The second way to manually generate captions offline. This approach can be used in the case of pre-produced television shows, movies, etc. In this case, instantaneous alignment of a transcription with its corresponding position in the offline media is not necessary because a user can pause, rewind, fast forward, etc. through the offline media. This approach is potentially more accurate than transcriptions in real time, but can also be very time-consuming and expensive.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, computer-implemented methods, and tangible computer-readable storage media for captioning a media presentation. The method includes receiving automatic speech recognition (ASR) output from a media presentation and receiving a transcription of the media presentation. The method then includes selecting via a processor a pair of anchor words in the media presentation based on the ASR output and transcription, and generating captions by aligning the transcription with the ASR output between the selected pair of anchor words.

In one embodiment, the transcription is human-generated. The step of selecting a pair of anchor words can be based on a similarity threshold between the ASR output and the transcription. The method can further include filtering out commonly used words from a predetermined word list when selecting pairs of anchor words. The method can also include outputting the media presentation with the captions. The method can include updating an ASR dictionary associated with the ASR output based on the transcription if the transcription is different from and more reliable than the ASR output. A plurality of ASR passes can generate the ASR output.

In the case of a real-time media presentation, the method can also include delaying the real time media presentation, buffer captions based on the media presentation and the aligned transcription, and output the delayed media presentation and buffered captions together. The media presentation can be a stored recording of a live event.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
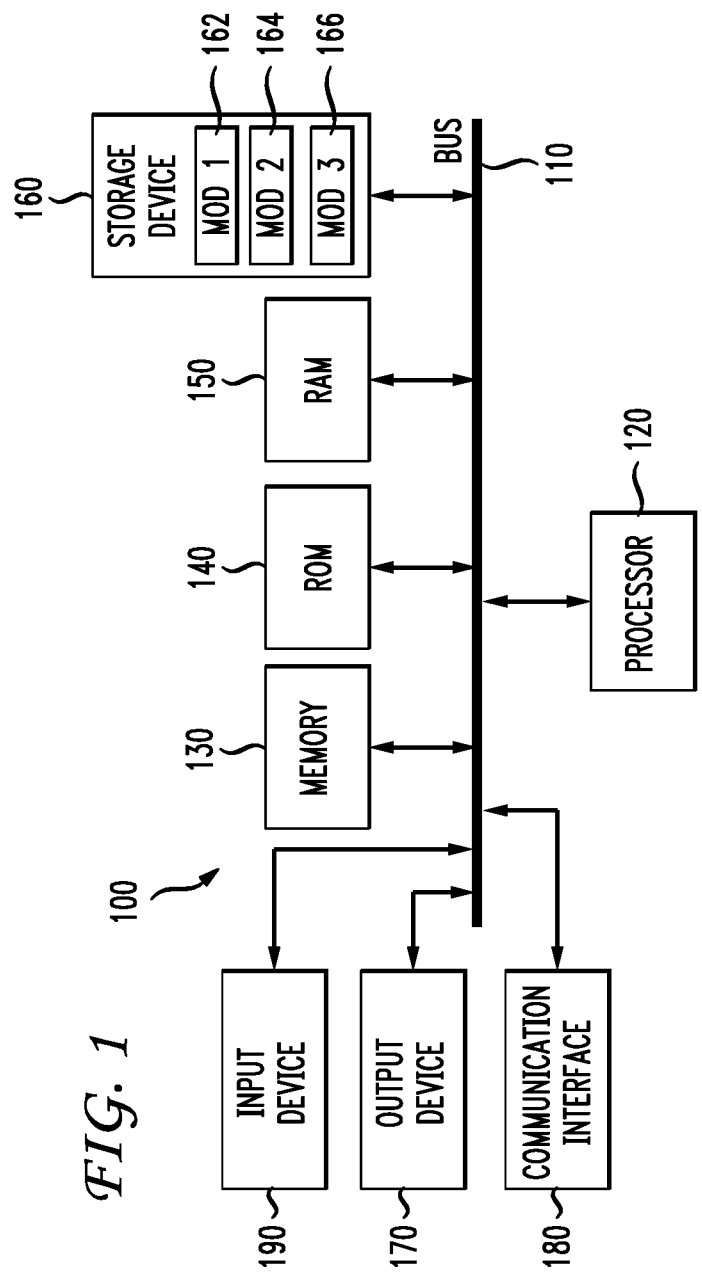
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

For clarity of explanation, the illustrative system embodiment is presented as including individual functional blocks including functional blocks labeled as a processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. Use of the term "processor" should not be construed to refer exclusively to hardware capable of executing software. Illustrative embodiments include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
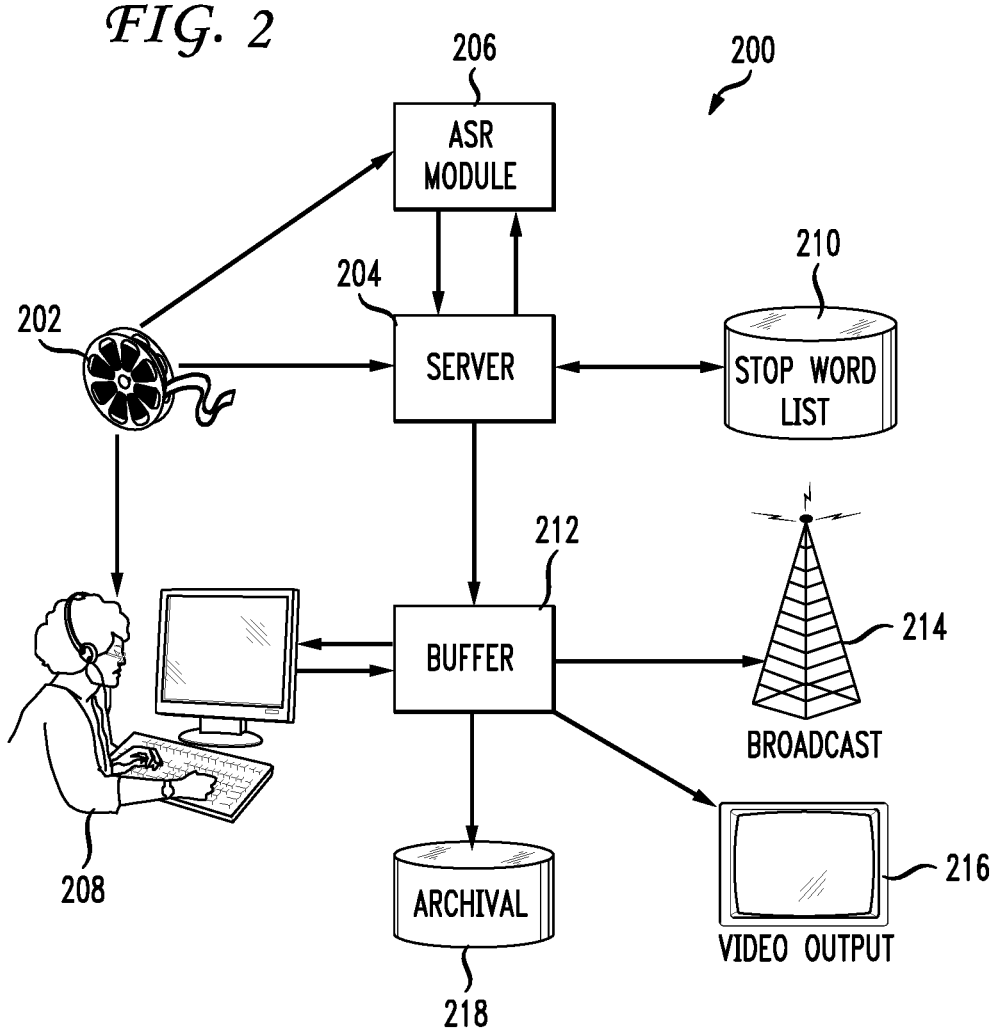
FIG. 2 illustrates an example captioning system.

FIG. 2 illustrates an example captioning system 200. The captioning system 200 includes a server 204 which receives a multimedia presentation 202, such as a stored television program, a movie, a radio show, a live event, a video clip, or other linear media including an audible speech portion. The server 204 can include the various hardware components of FIG. 1, including the modules configured to control the processor 120 to perform the steps disclosed herein. In one aspect, the various modules such as ASR module 206 control the processor to perform their steps. The server 204 can distribute the multimedia presentation 202 to an ASR module 206 and a transcriber 208 or the multimedia presentation 202 can be split and directed to the ASR module 207 and transcriber 208 without the server's 204 intervention. The ASR module 206 processes the audio portion of the multimedia presentation 202, generates an ASR output, and sends the output to the server 204. The ASR module 206 generates the output in real-time or nearly real-time. The transcriber 208 generates a transcription of the same multimedia presentation 202 and sends it to the server 204. The transcriber 208 can be a human being, an automated system, or some combination thereof.

The server 204 identifies anchor words in the transcription and ASR output based on confidence scores from the transcriber 208 and/or the ASR module 206. The anchor words can be words, phrases, or components of words that the server 204 is certain are correct and can be used to fix timing of that anchor. For this reason, the server 204 can identify stop words from a stop word list 210 of commonly used words which are not allowed to be used as anchor words. Unique and uncommon words are more likely candidates for anchor words, as are more common words with a high recognition certainty. In one aspect, the server 204 selects anchor words based on a distance threshold so that anchor words are not too far apart and/or not too close. The server 204 can select anchor words based on other factors, such as the content of the multimedia presentation 202, for example. When the server 204 identifies anchor words, it then aligns the content of the transcription with the timing of the ASR output between anchor words. The content between anchor words typically stays in the bounds set by the anchor words and the timing moves left or right within those limits. In this manner, the server 204 generates captions incorporating the high accuracy of the transcription with the near perfect timing of the ASR output. Even if the content between anchor words is not perfectly aligned, the anchor words provide a reference frame that is aligned periodically throughout the multimedia presentation 202.

The server 204 can buffer 212 or delay playback or output of the multimedia presentation 202 to account for the time necessary to receive and process the ASR output and transcription. Once the captions are generated, the server 204 allows the buffer 212 to play the multimedia presentation in sync with the captions. This delay can be only a matter of seconds but can range up to minutes or longer. The server 204 instructs the buffer 212 to output a broadcast signal 214, directly to a video output 216 such as for a cable television network or a closed circuit television system, or archive 218 the video on a digital or analog storage medium such as a RAM, HDD, DVD, flash memory, network-based storage, and any other suitable storage medium. The server 204 also batch processes multiple media presentations for later display. For example, the server 204 processes a day's worth of television programming six hours in advance or one day in advance. The server 204 processes films in movie theaters for the hearing impaired for use on a device other than the main media display, such as a handheld device or a cellular phone. In the case of a live presentation in a large conference, the server 204 processes the presentation in real time for creating a closed-captioned DVD or online video file at the end of the conference.

The principles disclosed herein are equally applicable to any language and media having more than one language. In the case of multilingual media, the server 204 translates transcriptions into another language, but this makes anchor word selection more complex because different languages present the same ideas in different word order. One way to resolve this complexity is to select or prefer anchor words that indicate the beginning and end of a sentence or a complete thought. In this way, even though the word order or word selection is different, the translated transcriptions are still aligned with the timing of the spoken sentence or idea.

Figure 3:
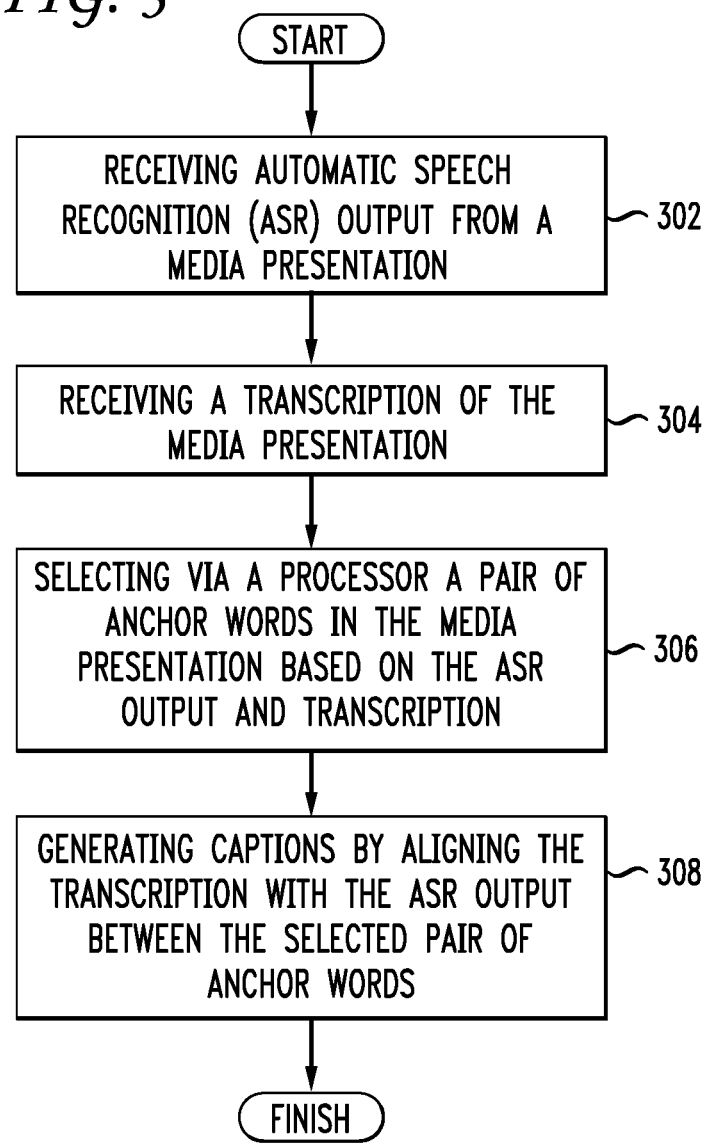
FIG. 3 illustrates an example method for captioning a media presentation.

Having disclosed some basic system components in FIGS. 1 and 2, the disclosure now turns to the exemplary method embodiment shown in FIG. 3 for captioning a media presentation. For the sake of clarity, the method is discussed in terms of an exemplary system 100, 200 as shown in FIGS. 1 and 2 configured to control a processor in a system or device to practice the method. First, the system 100, 200 receives automatic speech recognition (ASR) output from a media presentation (302). The ASR output can be a plurality of ASR passes. The ASR passes can be of varying quality. The system 100, 200 accepts virtually any suitable ASR approach or approaches. In one aspect, the ASR output is generated in real time from a television broadcast, for example. In another aspect, the ASR output is generated from a recording, such as a cluster of computers configured to process a season of previously recorded sitcom episodes (or any other program) all at once.

Then the system 100, 200 receives a transcription of the media presentation (304). The transcription can be human-generated. Human transcription can provide a more accurate transcription than an automated transcription. The transcription can also occur in near real time, or as close to real time as the transcriber can perform. The transcription can also occur in a batch, such as a batch of television episodes or radio programs. If the transcription is different from and more reliable than the ASR output, the system 100, 200 updates an ASR dictionary associated with the ASR output based on the transcription.

The system 100, 200 selects via a processor a pair of anchor words in the media presentation based on the ASR output and transcription (306). The anchor words can indicate recognized words which are very certain to be correct. A pair of anchor words indicates that those two points in the ASR output and transcription are good matches and have a higher chance of being correct. The system manipulates the content between the anchor words to best match the media presentation. One way to find suitable anchor word pairs is based on a similarity threshold between the ASR output and the transcription. Another approach is to filter out commonly used words, such as "a", "that", "of", and "for". These words occur so frequently that they may provide little benefit as anchor words. The system 100, 200 maintains a word list of such commonly used words and update the word list by tracking statistics of processed words and adding or removing words from the list that exceed or drop below a usage threshold. By filtering out commonly used words and focusing on words having a high similarity threshold, the system 100, 200 identifies the best candidates for anchor words. The system 100, 200 can also apply other criteria to identify anchor word pairs, such as a minimum and/or maximum time duration between anchor word pairs. In this case, if two candidate anchor words are too far apart, the system 100, 200 can select an anchor word between the two of them that satisfies the time duration requirements, even if that anchor word would not otherwise be selected.

For each respective selected pair of anchor words, the system generates captions by aligning the transcription with the ASR output between the respective selected pair of anchor words (308). The system 100, 200 also includes an output module for outputting the media presentation with the captions. The output can be on a television set or monitor, a file on a hard drive or other storage device, an Internet stream, an over-the-air or cable broadcast, or other suitable output.

If the media presentation is in real-time, the system further delays the real time media presentation, buffers captions based on the media presentation and the aligned transcription, and outputs the delayed media presentation and buffered captions together. In one aspect, the media presentation is a stored recording of a live event.

Figure 4:
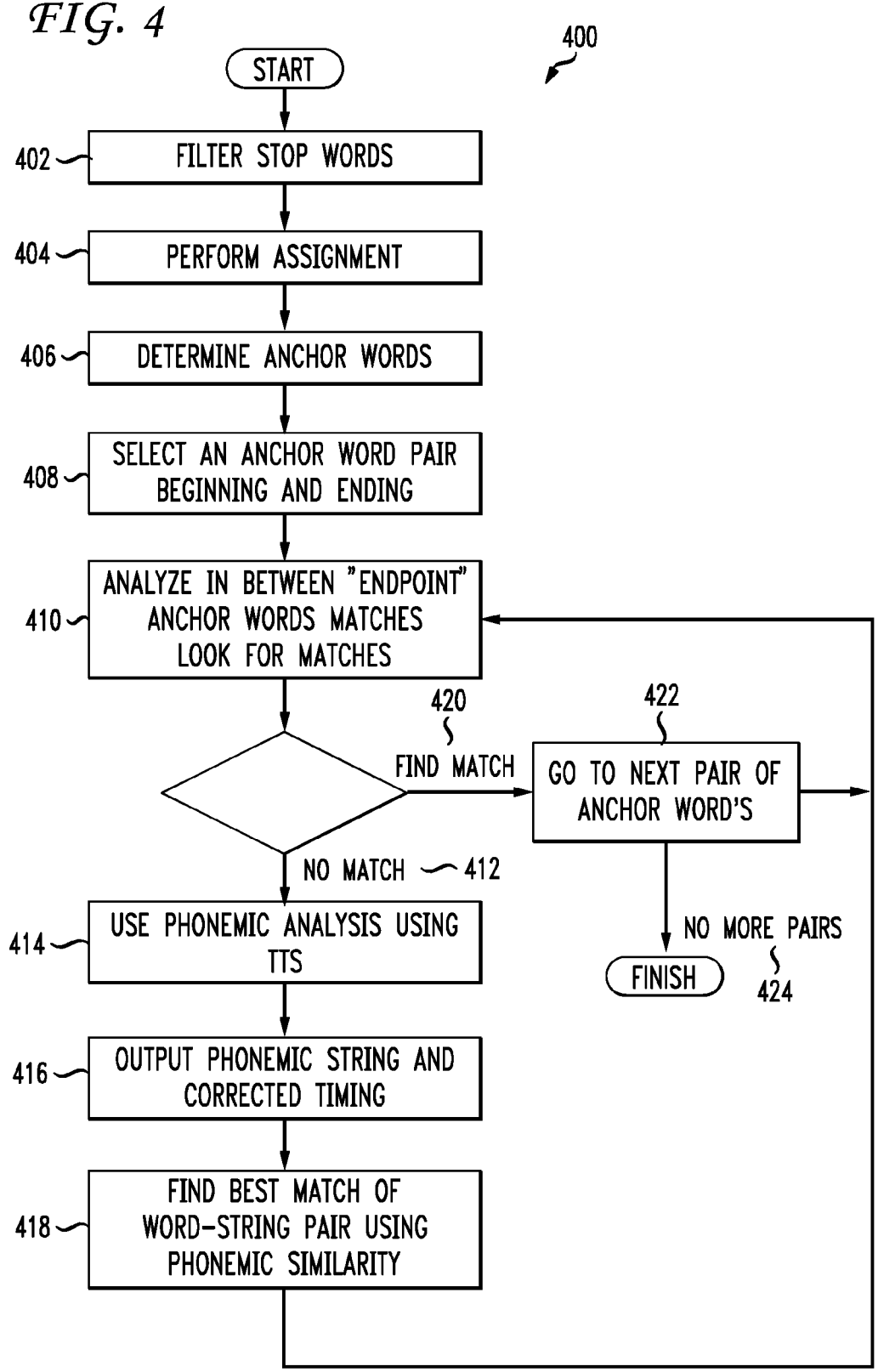
FIG. 4 illustrates an example flow chart for captioning a media presentation.

FIG. 4 illustrates an example flow chart for captioning a media presentation 400. This flow chart is described in terms of a system 100, 200 such as those shown in FIGS. 1 and 2, configured to perform the steps in the flow chart. It is assumed that the system 100, 200 already has the ASR output and at least part of the transcription. The system 100, 200 filters stop words 402. See Table 1 below and the accompanying description for additional discussion of stop words. The system 100, 200 performs an initial alignment 404 of the ASR output and the transcription and determines anchor words 406. In one aspect anchor words are uncommon words and/or common words with a high recognition certainty. Anchor words serve as anchor points where the system 100, 200 is sure that the transcription and ASR output align. The intermediate portion between anchor words then fits somewhere between the anchor points and significantly narrows down the range of possible alignments.

The system 100, 200 selects an anchor word pair of a beginning anchor word and an ending anchor word 408 and analyzes between the beginning and ending anchor points looking for matches 410. If the system 100, 200 does not find an immediate match 412, it can switch to a phonetic analysis using text-to-speech (TTS) 414 and outputs phoneme strings and corrected timing 416. The system 100, 200 can then find the best match of word-string pairs using phonetic similarity 418. The best matches are restricted to locations between the beginning and ending anchor points, which can resolve what would otherwise be ambiguous matches. Then the system 100, 200 loops back up to select another anchor word pair 408.

On the other hand, if the system 100, 200 finds a match between the anchor words 420, the system aligns the match and goes to the next pair of anchor words 422. At any point in the flow chart if there are no more unprocessed word pairs 424, the flow ends and can optionally output the aligned captions. The output can be saved to a local file separate from the media, incorporated into a media file, directly displayed on a monitor, and/or broadcast over the air or other transmission medium.

Figure 5:
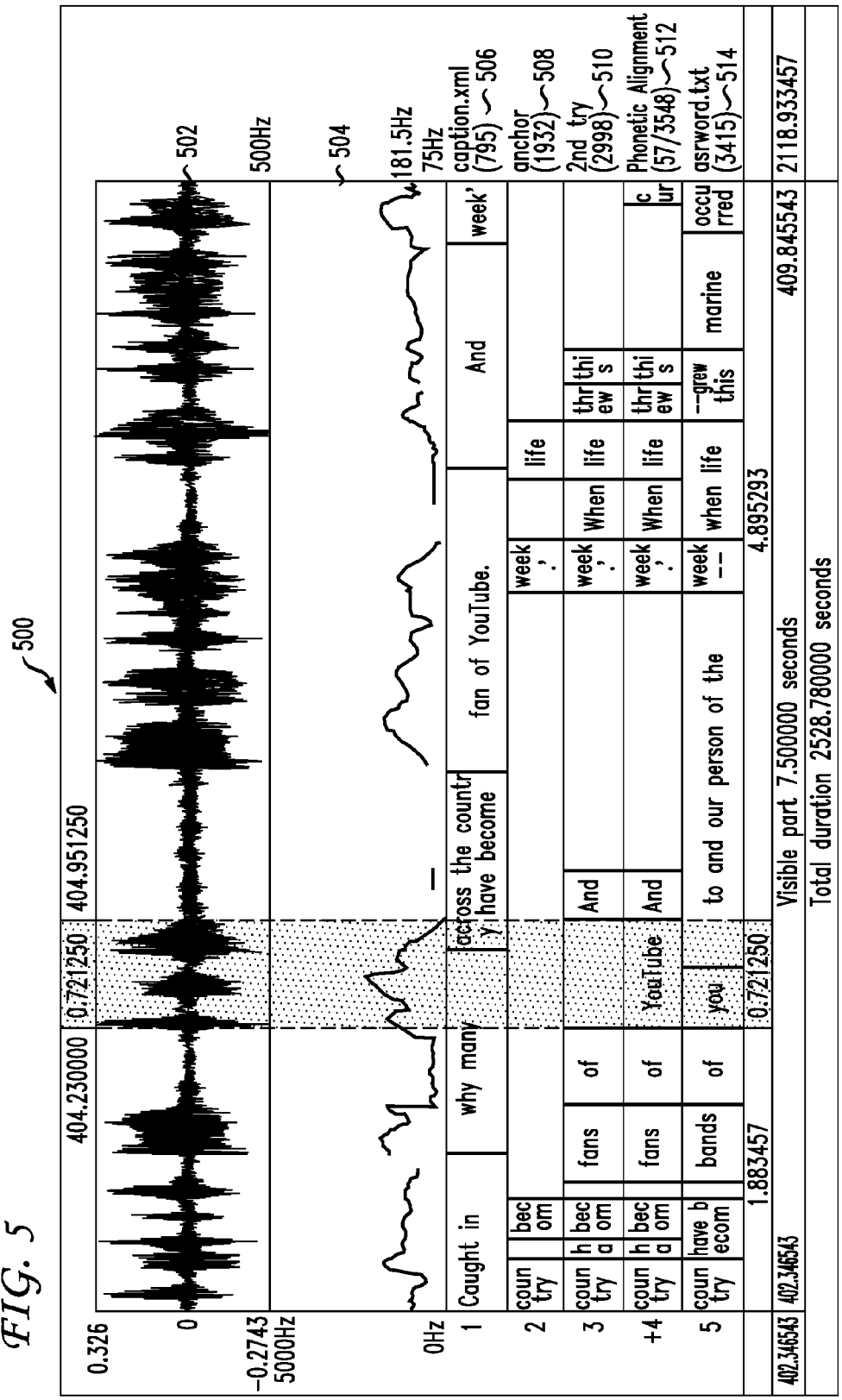
FIG. 5 illustrates an audio track of a media presentation, a transcription, ASR output, and aligned captions.

FIG. 5 illustrates a combined view 500 representing different stages of the captioning output based on an audio track 502 of a media presentation. The audio track can include a frequency chart 504. A transcriber generates a transcription 506 of the audio track 502, but the transcription is time delayed. For example, the "fans of YouTube" section of row 506 is later than the shaded column where the audio track 502 actually says "fans of YouTube". The ASR output 514 is properly aligned, but contains errors. For example, the ASR output 514 recognizes "fans of YouTube" in the audio track 502 as "bands of you to". The system 100, 200 uses ASR to detect anchor words 508. In one aspect, the system 100, 200 performs a second pass 510 to check for additional anchor words or perform other tasks. In this case, the system 100, 200 selects uncommonly used words with a high recognition certainty as anchor words. The system 100, 200 aligns the transcription 504 and ASR output 514 by matching the anchor words 508 in both, selecting a start anchor and end anchor, and aligning the text between the anchors. The result is a phonetically and temporally aligned caption 512. Note that the second pass 510 and the aligned caption 512 differ in one word, "YouTube". The word "YouTube" is not in the ASR dictionary, so the system 100, 200 adds the word "YouTube" based on the transcription 506 and the associated portion of the audio track 502. In this manner, the system 100, 200 can update the ASR dictionary to recognize new words or adapt existing dictionary entries based on the transcription 506. The system 100, 200 can update the dictionary based on a transcription and/or ASR certainty.

As set forth above, stop words are words that are used too frequently to be of use as anchor words. The system 100, 200 can exclude such stop words when detecting anchor words in the transcription and ASR output. The system can exclude stop words in an early stage because stop words occur quite often and can cause alignment errors. Table 1 shows a list of some potential stop words and how many times they occurred in a sample corpus of 63,975 words. The system can select all or part of these potential stop words as well as other stop words. Table 1 is exemplary. Stop words can vary based on the subject matter of the media. For example, in a nature show about wolves, "wolf" can be a stop word because it occurs frequently, where it would normally not be a stop word for other media.

TABLE 1

| WORD | OCCURRENCES | PERCENT OF CORPUS |
|---|---|---|
| A | 1519 | 2.37 |
| About | 220 | 0.34 |

TABLE 1-continued

| WORD | OCCURRENCES | PERCENT OF CORPUS |
|---|---|---|
| After | 134 | 0.21 |
| All | 226 | 0.35 |
| An | 187 | 0.29 |
| And | 1438 | 2.25 |
| Are | 398 | 0.62 |
| As | 256 | 0.4 |
| At | 297 | 0.46 |
| Be | 321 | 0.5 |
| Been | 142 | 0.22 |
| But | 361 | 0.56 |
| By | 228 | 0.36 |
| Do | 139 | 0.22 |
| For | 698 | 1.09 |
| From | 269 | 0.42 |
| Get | 131 | 0.2 |
| Has | 229 | 0.36 |
| Have | 379 | 0.59 |
| He | 346 | 0.54 |
| Her | 128 | 0.2 |
| Here | 170 | 0.27 |
| His | 242 | 0.38 |
| I | 476 | 0.74 |
| If | 146 | 0.23 |
| In | 1315 | 2.06 |
| Iraq | 200 | 0.31 |
| Is | 968 | 1.51 |
| It | 700 | 1.09 |
| It's | 159 | 0.25 |
| Just | 138 | 0.22 |
| Like | 137 | 0.21 |
| More | 214 | 0.33 |
| New | 226 | 0.35 |
| News | 153 | 0.24 |
| Not | 242 | 0.38 |
| Now | 189 | 0.3 |
| Of | 1349 | 2.11 |
| On | 504 | 0.79 |
| One | 209 | 0.33 |
| Our | 167 | 0.26 |
| Out | 180 | 0.28 |
| Reporter | 356 | 0.56 |
| Say | 133 | 0.21 |
| So | 153 | 0.24 |
| Some | 153 | 0.24 |
| That | 729 | 1.14 |
| The | 3378 | 5.28 |
| Their | 145 | 0.23 |
| There | 209 | 0.33 |
| They | 386 | 0.6 |
| This | 569 | 0.89 |
| To | 1667 | 2.61 |
| Today | 222 | 0.35 |
| Tonight | 225 | 0.35 |
| U.S. | 149 | 0.23 |
| Up | 174 | 0.27 |
| War | 132 | 0.21 |
| Was | 391 | 0.61 |
| We | 358 | 0.56 |
| Were | 162 | 0.25 |
| What | 189 | 0.3 |
| When | 161 | 0.25 |
| Who | 197 | 0.31 |
| Will | 191 | 0.3 |
| With | 367 | 0.57 |
| You | 449 | 0.7 |

In case the word-level alignment fails, the system 100, 200 can perform phone-level alignment. Phone-level alignment transcribes words in caption and ASR output into phonetic symbols with the assistance of text-to-speech (TTS) text-analyzing front end, and aligns phonetic symbols in both sides using phonetic similarity. The phonetic similarity can be implemented in a weight matrix. This approach can overcome ASR errors especially for out-of-vocabulary words. Tables 2A-2H illustrate several snippets of exemplary phone-level alignment output. These snippets illustrate situations in which ASR recognized the speech incorrectly, but phone-level alignment can still assist the system 100, 200 in aligning the transcription with the ASR output.

TABLE 2A

Transcription: iraq
ax r aa k
ASR out: a rock
ax r aa k

TABLE 2B

Transcription: YouTube
y uw t wu b
ASR out: you to
y uw t wu

TABLE 2C

Transcription: 1990s
n ay n t iy n hh ah n d r ih d n ay n t iy z
ASR out: nineteen nineties
n ay n t iy . . . n . . . n ay n t iy z

TABLE 2D

Transcription: surge the surge
s er jh dh . ax s er jh
ASR out: surgeon assert
s er jh ax n ax s er t

TABLE 2E

Transcription: Iraqi officials offer
ax . r aa k iy ax f ih sh ax l z ao f e r . . .
ASR out: we're accusations off for
w iy r ae k y uw z ey sh ax n z ao f f ao r

TABLE 2F

Transcription: morbid statistic only
m ao r b ih d s t ax t ih s t ih k ow n l . iy .
ASR out: mortgage to to stick all week
m ao r g ih . jh t ax t ax s t ih k . ao l w iy k

TABLE 2G

Transcription: too sees hopeful science we experienced some intial
t uw s iy z hh ow p f ax l s ay ax n s w iy . ih k s p iy r iy
ax n s t s ah . m ih n ih sh ax l
ASR out: to he spoke with signs we're experiencing the missile
t uw hh iy s p ow k w ih th s ay . n z w iy r ih k s p iy r
iy ax n s ih ng dh ax m . . . ih s ax l

TABLE 2H

Transcription: suspects detained
s ah s p eh k t s d ax t ey n . . . d
ASR out: suspect a painter and
s ax s p eh k t . . . ax p ey n t er ae n d Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable storage media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be used in live television broadcasts, radio shows, online videos, news, and any other linear media having a speech component. Those skilled in the art will readily recognize various modifications and changes that may be made to the principles described herein without following the example embodiments and applications illustrated and described herein, and without departing from the spirit and scope of the disclosure.

We claim:

1. A method comprising:
comparing a transcription of a media presentation to a list of anchor word candidates to identify a pair of anchor words separated from one another within the media presentation by a time greater than an anchor word time duration requirement; and generating captions by aligning the transcription with an automatic speech recognition output of the media presentation according to the pair of anchor words.

2. The method of claim 1, wherein the list of anchor word candidates further comprises a stop word list of words not to be considered as the pair of anchor words.

3. The method of claim 1, wherein the anchor word time duration requirement represents a minimal time duration requirement between words in the pair of anchor words.

4. The method of claim 1, wherein generating the captions further comprises aligning the transcription between the pair of anchor words.

5. The method of claim 1, further comprising:
outputting the media presentation with the captions.

6. The method of claim 1, wherein the media presentation is in real-time, the method further comprising:
buffering the captions based on the media presentation and the aligning of the transcription to yield buffered caption; and
outputting a delayed media presentation and the buffered captions together.

7. The method of claim 1, wherein the media presentation is in real-time, the method further comprising:
buffering the media presentation to yield a delayed media presentation; and
outputting the delayed media presentation and the captions together.

8. A system comprising:
a processor; and
a computer-readable storage device storing instructions which, when executed by the processor, cause the processor to perform operations comprising:
comparing a transcription of a media presentation to a list of anchor word candidates to identify a pair of anchor words separated from one another within the media presentation by a time greater than an anchor word time duration requirement; and
generating captions by aligning the transcription with an automatic speech recognition output of the media presentation according to the pair of anchor words.

9. The system of claim 8, wherein the list of anchor word candidates further comprises a stop word list of words not to be considered as the pair of anchor words.

10. The system of claim 8, wherein the anchor word time duration requirement represents a minimal time duration requirement between words in the pair of anchor words.

11. The system of claim 8, wherein generating the captions further comprises aligning the transcription between the pair of anchor words.

12. The system of claim 8, wherein the computer-readable storage device stores further instructions which, when executed by the processor, cause the processor to perform an operation further comprising outputting the media presentation with the captions.

13. The system of claim 8, wherein the media presentation is in real-time, and wherein the computer-readable storage device stores further instructions which, when executed by the processor, cause the processor to perform an operation further comprising:
buffering the captions based on the media presentation and the aligning of the transcription to yield buffered caption; and
outputting a delayed media presentation and the buffered captions together.

14. A computer-readable storage device storing instructions which, when executed by a processor, cause the processor to perform operations comprising:
comparing a transcription of a media presentation to a list of anchor word candidates to identify a pair of anchor words separated from one another within the media presentation by a time greater than an anchor word time duration requirement; and
generating captions by aligning the transcription with an automatic speech recognition output of the media presentation according to the pair of anchor words.

15. The computer-readable storage device of claim 14, wherein the list of anchor word candidates further comprises a stop word list of words not to be considered as the pair of anchor words.

16. The computer-readable storage device of claim 14, wherein the anchor word time duration requirement represents a minimal time duration requirement between words in the pair of anchor words.

17. The computer-readable storage device of claim 14, wherein generating the captions further comprises aligning the transcription between the pair of anchor words.

18. The computer-readable storage device of claim 14, wherein the computer-readable storage device stores further instructions which, when executed by the processor, cause the processor to perform an operation further comprising outputting the media presentation with the captions.

19. The computer-readable storage device of claim 14, wherein the media presentation is in real-time, and wherein the computer-readable storage device stores further instructions which, when executed by the processor, cause the processor to perform an operation further comprising:
buffering the captions based on the media presentation and the aligning of the transcription to yield buffered caption; and
outputting a delayed media presentation and the buffered captions together.

20. The computer-readable storage device of claim 14, wherein the media presentation is in real-time, and wherein the computer-readable storage device stores further instructions which, when executed by the processor, cause the processor to perform an operation further comprising:
buffering the media presentation to yield a delayed media presentation; and
outputting the delayed media presentation and the captions together.

* * * * *